Fig. 2          Fig. 3

Sept. 27, 1966     A. R. SPOHR     3,274,631

ELECTRIC CORDLESS TOOTHBRUSH

Filed March 20, 1964     5 Sheets-Sheet 3

INVENTOR
ALBERT R. SPOHR by George R. Clark
ATTORNEY.

Sept. 27, 1966  A. R. SPOHR  3,274,631
ELECTRIC CORDLESS TOOTHBRUSH
Filed March 20, 1964  5 Sheets-Sheet 4

INVENTOR
ALBERT R. SPOHR
by
George R. Clark
ATTORNEY.

Sept. 27, 1966 A. R. SPOHR 3,274,631
ELECTRIC CORDLESS TOOTHBRUSH
Filed March 20, 1964 5 Sheets-Sheet 5

INVENTOR
ALBERT R. SPOHR
by
George R. Clark
ATTORNEYS.

United States Patent Office
3,274,631
Patented Sept. 27, 1966

3,274,631
ELECTRIC CORDLESS TOOTHBRUSH
Albert R. Spohr, Park Ridge, Ill., assignor to Sunbeam Corporation, Chicago, Ill., a corporation of Illinois
Filed Mar. 20, 1964, Ser. No. 353,327
14 Claims. (Cl. 15—22)

This invention relates to an electric appliance, and more particularly to a rechargeable battery operated electric toothbrush and to a combination stand and charging unit therefor.

Power driven toothbrushes for use in the home customarily include a single hand held power unit and a plurality of individual toothbrush attachments for use by the individual members of the family. The individual toothbrush attachments, which are stored with the power unit, may be adapted to be attached to and detached from the power unit by the individual user at the time of use. The details of one readily releasable mechanical drive connection for connecting a toothbrush attachment to a power unit are disclosed in Spohr Patent No. 3,187,360, granted June 8, 1965, and assigned to the same assignee as the present application.

In order to provide an electric toothbrush that is easy to manipulate during the tooth cleaning operation, it is desirable that the hand held portion be of convenient shape, size, and weight. Power toothbrushes used in the past often were heavy, bulky, and difficult to control. In addition, many electric toothbrushes were required to be connected to an electric outlet during use, and the power cord necessary for this connection tended to obstruct the convenient use of the brush and to impair mobility of the unit. It would, therefore, be desirable to provide a cordless electric toothbrush of light weight and convenient size.

Cordless electric appliances customarily include one or more battery operated units which provide the power for the appliance involved. The nickel cadmium battery has been found to be the most satisfactory type for this application because of its long life and its ability to be easily recharged. Such a battery, when used in an electric appliance, requires frequent recharging and it is preferable to charge the battery continuously during the period when it is not in use where this is possible. The apparatus for charging the battery may include a transformer and a diode rectifier. Some electric appliances have been connected to the charging apparatus by means of a cord which is plugged into the appliance. For a cordless electric toothbrush this arrangement is unsatisfactory because the hand held unit is difficult to store neatly when it is connected by a cord to the charging assembly, which must in turn be connected to a wall outlet. It would, therefore, be desirable to provide a secure and convenient storage facility for the appliance and its various attachments and to provide means for recharging the battery of the appliance while it is stored therein.

A power unit for a toothbrush attachment should be capable of imparting to the brush a motion effective in cleaning teeth. One type of motion which has been found to be satisfactory is a high speed oscillation of the brush through an arc of rotation of about 10 to 30 degrees. When the toothbrush attachment is connected to an output drive shaft, this shaft cannot move in a simple rotary motion. If a rotary motor is used, a drive system must be provided to transform the rotary motion of the motor shaft into an oscillatory motion at the output drive shaft. Such a drive system should be compact so as to be contained in a hand held power unit of small size, should be of light weight, should be economical to produce, and should give long service without necessity for repair.

Accordingly, it is an object of the present invention to provide a new and improved electric toothbrush appliance including a hand held power unit and a stand therefor having a charging assembly associated therewith.

It is a further object of the present invention to provide a cordless hand held power unit for powering toothbrush attachments or the like which is convenient in size and shape and is light in weight.

It is another object of the present invention to provide a drive system for an electric toothbrush or the like characterized by the fact that it is easy to fabricate, effective in operation, sturdy in construction, and compact in size.

It is still another object of the present invention to provide a new and improved connection for connecting charging apparatus to the rechargeable battery of a hand held power unit of an electric toothbrush or other appliance.

It is another object of the present invention to provide a new and improved casing mounted switching mechanism for an electric appliance which is easily operated and economical to produce.

Further objects and advantages of the present invention will become apparent as the following description proceeds, and the features of novelty which characterize the invention will be pointed out with particularity in the claims annexed to and forming a part of the specification.

These and further objects of the present invention will become apparent from the following description taken with the accompanying drawings in which:

FIG. 6 is an enlarged sectional view taken along line 6—6 of FIG. 4 again assuming FIG. 4 shows the complete structure;

FIG. 7 is an enlarged fragmentary sectional view taken along line 7—7 of FIG. 4 again assuming FIG. 4 shows the complete structure;

Briefly, the electric cordless toothbrush of the present invention includes a compact hand held power unit adapted to be stored in a charging and support unit, which is also adapted to hold several toothbrush attachments used with the power unit. The power unit includes a rechargeable battery and a rotary electric motor adapted to be driven thereby. The power unit is provided with an output drive shaft to which the toothbrush attachments may be connected, and which is driven in an oscillatory manner by means of a drive system interconnecting the motor and the output drive shaft. The power unit is contained in a generally cylindrical casing of convenient size, and a switching mechanism is mounted on the casing for completing the connection between the battery and the motor. The charger stand contains charging apparatus which is connected to the wall outlet by means of a cord and plug. Provision is made to connect the battery of the power unit to the charging apparatus when the power unit is stored in the charger stand.

Figure 1:
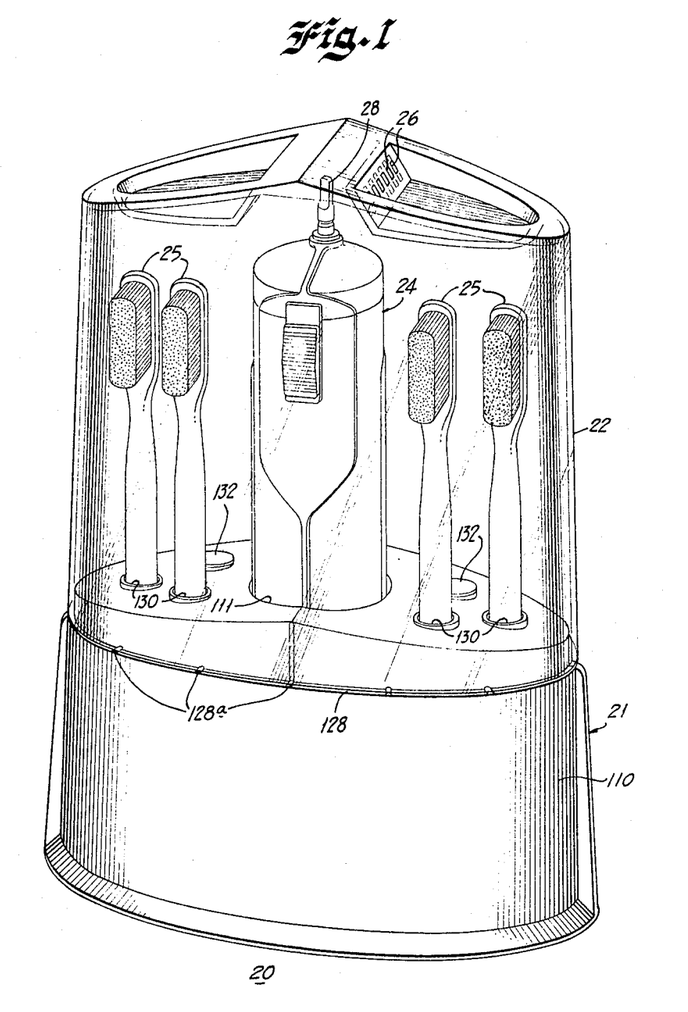
FIG. 1 is a perspective view of a charging and support unit for a cordless electric toothbrush in accordance with the present invention.
Figure 2:
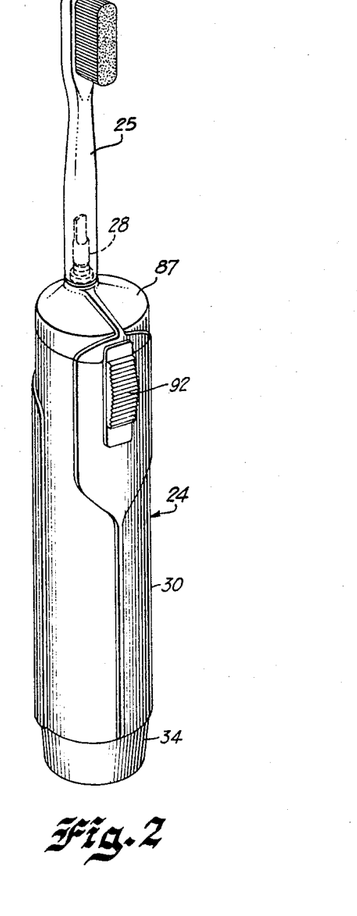
FIG. 2 is a perspective view of a hand held power unit and toothbrush attachment in accordance with the present invention.
Figure 3:
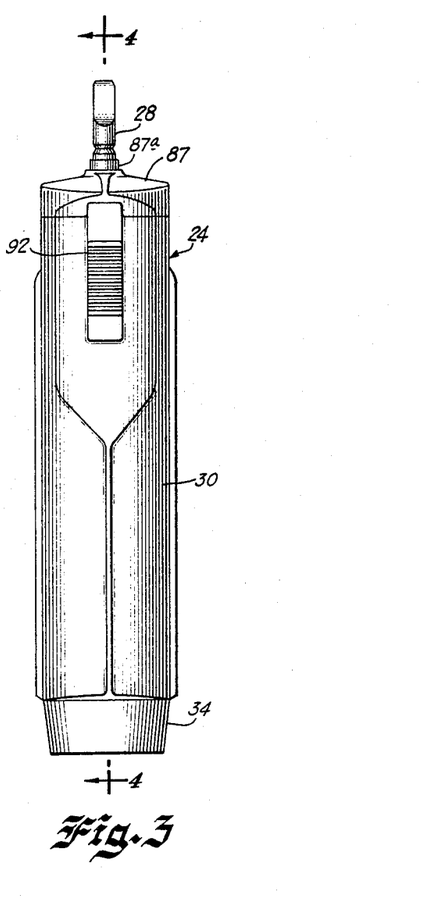
FIG. 3 is a side elevational view of the power unit of FIG. 2 with the toothbrush attachment removed.

Referring now to the drawings, there is illustrated a cordless electric toothbrush unit designated generally at 20 including a charging and support unit 21 having a transparent dust cover 22. Unit 21 is adapted to support a hand held power unit 24 and a plurality of toothbrush attachments 25 shown beneath the transparent cover 22. The dust cover 22 may be formed of transparent plastic or other suitable material and is preferably provided with a plurality of ventilating openings 26. The brushes 25 form no part of the present invention but are adapted to be drivingly secured to one end of a drive shaft 28 projecting from the hand held power unit 24. Preferably the driving engagement between the brushes 25 and the drive shaft 28 of the power unit 24 is that disclosed and claimed in Spohr Patent No. 3,187,360, referred to above.

Considering now the power unit 24 in detail, it comprises a molded housing 30 of a shape that may readily be held in the hand of the user. As illustrated in the drawings, the housing 30 is a cylindrical housing open at one end and closed at the other by a wall 30a, which wall is provided with a pair of counterbored openings 31 for suitable fastening means described hereinafter, and an opening 32 through which the driving end of the drive shaft 28 projects. At the end of cylindrical housing portion 30 adjacent the end wall 30a is a suitable recess 33, a portion of the bottom of which is defined by a thin flexible wall portion 30b integral with the casing 30. So that this wall portion may be flexed, there is a U-shaped opening 36 (FIG. 7) in the bottom of recess 33 connected with the interior of housing 30. The recess 33, as will become apparent from the ensuing description, is adapted to accommodate switch actuating mechanism for deflecting the wall portion 30b.

The housing 30 in addition to serving as a housing also serves as the handle for holding the power unit contained therein. To this end it must be relatively compact and in a device built in accordance with the present invention, the housing 30 had an outer diameter between an inch and a quarter and an inch and a half and an overall length of less than five inches.

Figure 4:
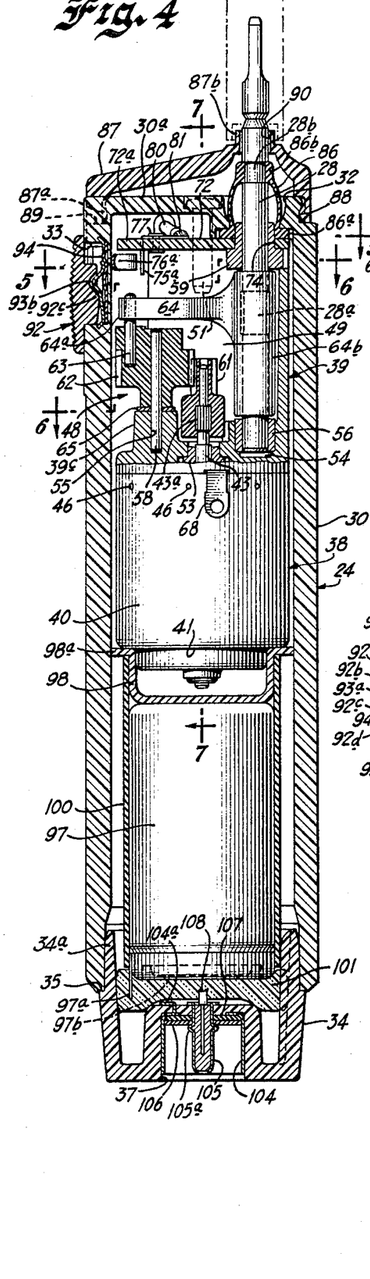
FIG. 4 is an enlarged sectional view of the power unit taken along line 4—4 of FIG. 3 with the control switch in the open position.

It will be appreciated by those skilled in the art that a power operated toothbrush is subjected to moisture and, consequently, it is important to provide a completely sealed housing for the power unit. Accordingly, the open end of housing 30 is closed by a suitable molded end cap 34 which is illustrated as a cup shaped member having an upper portion 34a of somewhat reduced diameter to define a shoulder 35, as best shown in FIG. 4 of the drawings. The reduced portion 34a is snugly received within the open end of housing 30 to the extent that the shoulder 35 is engaged by the adjacent end of the housing 30. Upon final assembly, a suitable cement is applied to sealingly secure the end cap 34 to cylindrical housing 30. The end cap 34 is illustrated as being provided with a reentrant portion defining a central recess 37 to accommodate contacts for a recharging circuit described hereinafter.

Figure 7:
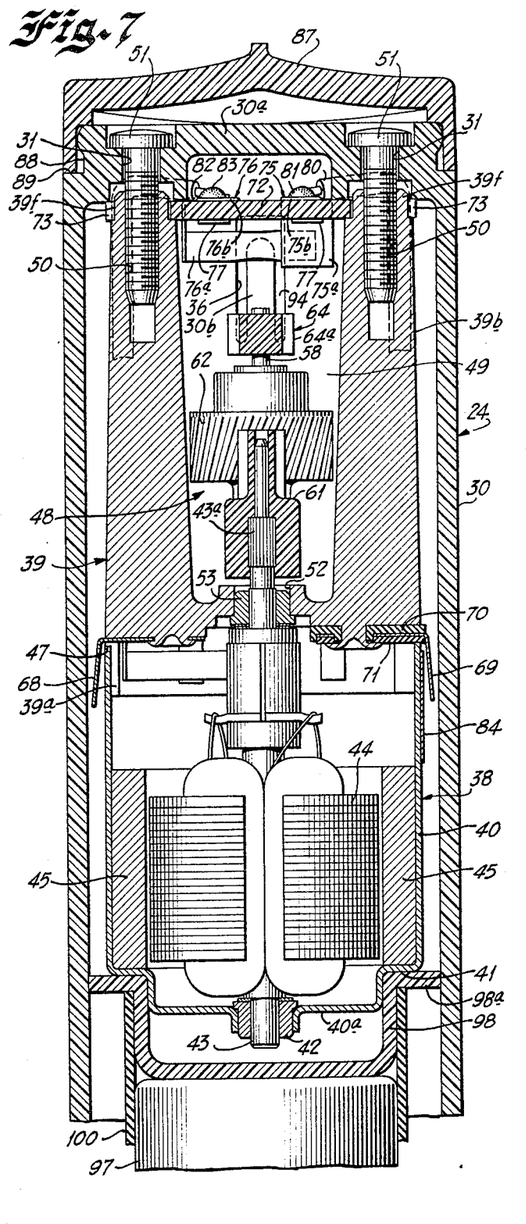

In order to actuate the drive shaft 28, which projects through the opening 32 of the housing 30 of power until 24, there is provided a subassembly including an electric motor 38 and a mechanism support 39. Any suitable electric motor of compact size sufficient to power the appliance connected to the drive shaft 28 may be employed. As best shown in FIG. 7 of the drawings, the motor 38 comprises a suitable somewhat cup shaped cylindrical housing 40 open at one end and closed at the other. As illustrated best in FIG. 7 of the drawings, the cup shaped motor housing is provided with a circular center projection 40a at the closed end defining an annular shoulder 41. An opening in this projection 40a accommodates a suitable bearing 42 for an armature shaft 43 supporting a suitable motor armature 44. The armature 44 is associated with the conventional field structure 45. To relate the motor 38 with the mechanism support 39, the latter, which is in the form of a die casting or the like, is preferably provided with a portion of reduced cross section 39a snugly receivable within the open end of the motor housing 40 so that the open end of this housing engages a shoulder 47 defined on the mechanism support 39. The motor 38 is then secured to the mechanism assembly 39 by a suitable staking operation, such as indicated at 46 in FIG. 4, thereby providing an integral motor and mechanism support disposed in coaxial alignment. The lower portion of the mechanism support immediately above the shoulder 47 preferably has a diameter of the order of the outside of the motor housing 40 so that when the two are assembled the motor 38 is substantially a continuation of the lower portion of the mechanism support 39.

For the purpose of supporting a driving mechanism, generally designated at 48 and described in detail hereinafter, the mechanism support 39 immediately above the lower portion thereof is of somewhat U-shaped configuration designated as 39b thereby defining a central mechanism chamber 49 between the legs and the bight of the U. The upper end of the U-shaped portion 39b is provided with a pair of diametrically opposed tapped openings 50 for accommodating suitable fastening means 51 whereby the subassembly comprising the motor 38, the mechanism support 39, and the driving mechanism 48 may be secured within the housing 30 to the wall 30a thereof, the fastening means 51 being received in the counterboard openings 31 described above.

So that the armature shaft 43 may project into the chamber 49 to actuate driving mechanism 48 from motor 38, the lower end of mechanism support 39 is provided with a central opening 52 for accommodating an upper bearing 53 for the armature shaft 43. In addition to the opening 52 in the lower end of the mechanism support 39, there are provided a pair of recesses 54 and 55 (FIG. 4). The recess 54 is disposed adjacent the bight portion of 39b and accommodates a sleeve bearing 56 for the lower end of the drive shaft 28. The recess 55, on the other hand, is disposed in a projection 39c of the mechanism support 39 and is adapted to receive the lower end of a gear spindle 58, the function of which is described hereinafter. In order to further support the drive shaft 28 in addition to the sleeve bearing 56, there is provided a flange bearing 59 which is, in turn, supported between U-shaped fingers 39d and 39e, best shown in FIGS. 5 and 6 of the drawings, projecting from the bight of the U-shaped portion 39b into the chamber 49 so as to define an elongated chamber for the drive shaft 28.

It has been found that an oscillating motion of the brush bristles of a toothbrush, such as 25, most closely approaches the desired brushing action recommended by dentists. In order to convert the rotary motion of the armature shaft 43 into oscillating motion of the drive shaft 28, there is provided within the mechanism chamber 49 the driving mechanism 48 which, in addition to the gear spindle 58, comprises a pinion 61, a gear 62, a drive spindle 63, and a drive fork 64. The elements 61, 62, and 64 are preferably molded of nylon or the like. As illustrated, the upper end of the armature shaft 43 projecting into the chamber 49 through the opening 52 is provided with a knurled portion 43a (FIG. 7) whereby the pinion 61 may be pressed thereon thereby to be driven by the motor shaft 43. The gear 62 is rotatably mounted on the gear spindle 58 and a suitable thrust washer 65 is interposed between the lower end of the gear 62 and the projection 39c, as best shown in FIG. 4 of the drawings. The gear 62 is also provided with an eccentric recess to receive the drive spindle 63 which, in turn, is receivable within an elongated recess 67 defined in a laterally projecting portion 64a of the drive fork 64 which also includes a tubular portion 64b integrally formed with lateral projection 64a.

As best shown in FIG. 4 of the drawings, the drive shaft 28 extends through the tubular portion 64b of the drive fork 64 and the former is provided with a knurled portion 28a for making driving connection with the drive fork 64. It will be appreciated that rotation of the motor shaft 43 will cause rotation of pinion 61 and, consequently, gear 62. Rotation of the eccentric pin 63 associated with gear 62 causes oscillating movement of the fork 64 and, consequently, of the drive shaft 28, the drive spindle 63 moving back and forth in the elongated recess or slot 67 of the portion 64a of the drive fork 64.

So that electrical connections for energizing the electric motor 38 can be made, suitable terminals are brought out at the junction of the motor housing 40 and the mechanism support 39. As best shown in FIG. 7 of the drawings, the negative motor terminal designated as 68 projects from one side of the housing and is an extension of a suitable conductor connected to the motor 38. Since the negative terminal is at ground potential, no insulation with respect to terminal 68 is necessary. The positive terminal designated as 69 is an extension of suitable conductor also connected to the motor 38 and is suitably insulated by insulating members 70 and 71 from the motor housing 40 and the mechanism support 39. In a device built in accordance with the present invention, motor 38 was a low voltage motor of the order of one and one-quarter volts which operated between six thousand and eighty-two hundred revolutions per minute. It was adapted to be energized from a suitable low voltage source, such as a rechargeable nickel cadmium battery.

Figure 5:
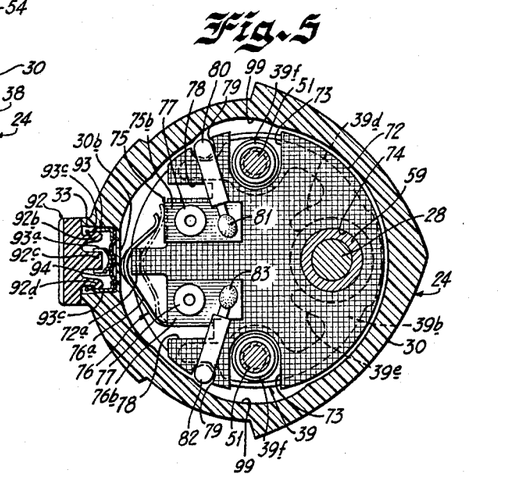
FIG. 5 is an enlarged sectional view taken along line 5—5 of FIG. 4 assuming that FIG. 4 shows the complete structure.
Figure 6:
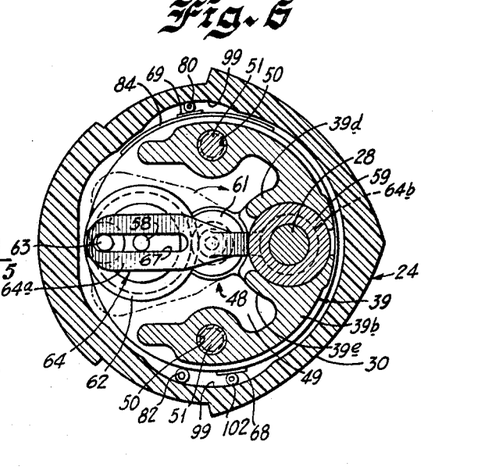
Figure 8:
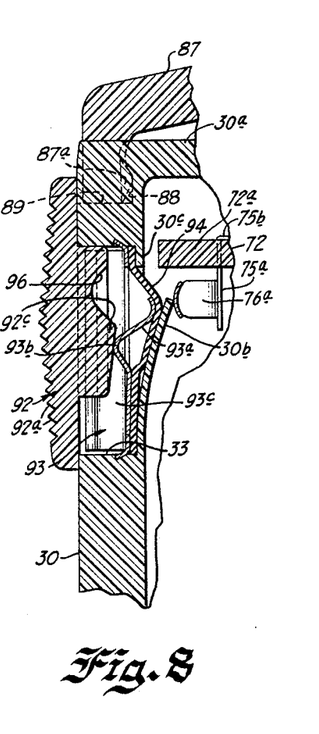
FIG. 8 is an enlarged fragmentary view of a portion of FIG. 4 showing the control switch in the closed position.

It will be appreciated that the operator must be able selectively to turn the motor 38 on and off, and to this end there is provided a suitable switch mechanism which is illustrated as comprising part of the subassembly including the motor 38, the mechanism support 39, and the mechanism 48. To this end and as best shown in FIGS. 4, 5, and 8 of the drawings, there is provided a switch plate 72 formed of a suitable insulating material in the shape of a somewhat circular disk having diametrically opposed notches 73 (FIG. 5) for receiving projecting lugs 39f (FIG. 7) on mechanism support 39 which surround tapped openings 50. The switch plate 72 preferably conforms to the outer periphery of the U-shaped portion 39b of mechanism support 39 and is provided with a suitable opening 74 for permitting the flanged bearing 59 for drive shaft 28 to project therethrough.

In order to accommodate a suitable switch mechanism, the portion of switch plate or disk 72 remote from the opening 74 is effectively cut away to provide a straight edge instead of the circular configuration of the remainder of the disk. As illustrated, however, at the center of this straight edge an integral projection 72a is permitted to remain. On one side of projection 72a there is mounted an L-shaped conducting member 75, one leg 75b of the L being secured to the top surface of the plate 72 by suitable fastening means, such as an eyelet rivet 77. The other leg 75a of the L (FIGS. 4 and 8) depends downwardly to define a stationary switch contact disposed in the path of movement of a movable switch contact 76a defined by a flexible switch arm formed as an integral part of a conductor 76. The movable contact 76a is shown in the open circuit position by solid lines in FIGS. 4 and 5 of the drawings and is shown in the closed circuit position by dotted lines in FIG. 5 of the drawings and by solid lines in FIG. 8 of the drawings. The conductor 76 includes a L-shaped portion 76b, one leg of which is in engagement with the top of switch plate 72 and secured thereto by suitable fastening means, such as rivet 77. The other leg is disposed in a notch 78 defined in the switch plate 72, as clearly shown in FIG. 5 of the drawings. So that the switch plate 72 is completely symmetrical from the standpoint of manufacture and assembly, an identical notch 78 is provided on the opposite side of projection 72a. To accommodate suitable conductors described hereinafter, switch plate 72 is also provided with peripheral conductor receiving notches 79.

In order to energize the motor 38 through the switch comprising contacts 75a and 76a, there is provided an insulated conductor 80 having one end electrically connected to the L-shaped conducting member 75, as indicated at 81, and the other end is connected to the positive motor terminal 69. To make such that this positive motor terminal 69, which is connected to the insulater conductor 80, does not become grounded against the conducting housing 40 of the motor 38, an insulating tape 84 (FIG. 7) is applied to the motor housing 40 immediately adjacent this positive terminal 69. The conductor 76 including the movable switch contact 76a is connected by an insulating conductor 82 having one end thereof connected to the L-shaped portion 76b, as indicated at 83. The other end of conductor 82 is connected to the positive terminal of a suitable battery described hereinafter.

From the above description, it will be apparent that there has been described a unit or subassembly comprising the motor 38, the drive shaft 29, a drive mechanism 48, mechanism support 39, and motor control switch 75a-76a for controlling the electric energy supplied to the motor 38. This subassembly, then in association with other parts described hereinafter, may be inserted as a unit into the housing 30 so that the drive shaft 28 projects through the opening 32 whereupon the movable switch contact 76a will be adjacent the flexible wall portion 30b of the housing 30. By means of the fastening means 51, this subassembly may be secured within the housing 30 in the position clearly shown in FIG. 4 of the drawings.

It will be apparent that moisture should not enter the casing or housing 30, and to accomplish this there is provided a drive shaft seal 86 which is preferably of tubular configuration including an annular flange at the lower end thereof, designated at 86a. This flange, as is clearly shown in FIG. 4 of the drawings, is clamped between the switch plate 72 and a parallel surface on the inside of the top 30a of casing 30 surrounding the opening 32, thereby sealing the opening 32 against the entrance of moisture. In order that moisture may not creep along the drive shaft 28, the latter is provided with a portion 28b of reduced cross section to snugly receive therein a thickened annular portion 86b of the drive shaft seal 86. The heads of the fastening means 51 disposed in the recesses forming a part of the recessed or counter-bored openings 31 also afford a seal against the entrance of moisture into the housing 30 through the openings 31.

To improve the appearance of the upper end of the housing 30 and particularly to enclose the fastening means 51 and the drive shaft seal 86, there is provided a flanged housing cap 87 preferably formed of somewhat resilient molded plastic material. In order to secure the cap 87 in position, it is preferably provided with lugs 87a projecting inwardly from the flange thereof which lugs are receivable in an annular groove 88 defined adjacent the closed end of housing 30. Preferably housing 30 is provided with an annular shoulder 89 adjacent groove 88 for engagement by the flange of cap 87, and whereby the cap 87 appears as a continuation of housing 30. Preferably the cap 87 is provided with an annular projecting flange 87b surrounding an opening 90 defined in the cap through which the drive shaft 28 may extend.

In order to actuate the switch comprising elements 75a and 76a from the exterior of housing 30, there is provided in accordance with the present invention a switch slide 92, a switch spring 93, and a switch seal 94 (FIGS. 4, 5, and 8), all of which are associated with the recess 33 in the housing 30 described above. The switch seal 94 is preferably a resilient seal made of neoprene rubber or similar stretchable material with a prestretched center section disposed in recess 3 against the deflectable wall portion 30b and with the upper end thereof in engagement with a downwardly projecting flange 30c integral with housing 30, best shown in FIG. 8 of the drawings. The seal 94, of course, prevents moisture from entering the opening 36 provided in housing 40 by virtue of the deflectable member 30b. Switch spring 93, best shown in FIGS. 4, 5, and 8 of the drawings, is essentially a U-shaped spring member adapted to be pushed into the recess 33 with the bight portion of the spring member against the seal 94 and with the legs 93c of the U projecting outwardly along the walls of the recess 33, as clearly shown in FIG. 5 of the drawings. A U-shaped slit is cut in the bight portion of the switch spring 93 so as to provide a movable resilient center finger 93a. The free end of finger 93a is the switch actuating portion while a V-shaped intermediate portion thereof designated as 93b (FIGS. 4 and 8) is adapted to be actuated by switch slide 92, as described hereinafter.

The switch slide 92 is provided with a serrated finger actuating portion 92a larger than the recess 33 so as to completely overlie this recess in either the on or off position of this slide. Integrally formed with portion 92a and receivable in recess 33 are three spaced parallel projections or ribs 92b, 92c, and 92d. The center projection or rib 92c is the switch actuating member and is provided with a V-shaped notch 96 which in the lower position of the switch slide 92, shown in FIG. 4 of the drawings, receives the projection 93b of the spring finger 93a. When the switch slide 92 is moved upwardly to the position shown in FIG. 8 of the drawings, the projection 93b is cammed out of notch 96 and finger 93a is moved to the right, as viewed in FIG. 8 of the drawings, so as to deflect the flexible member 30b into engagement with movable switch member 76a to a sufficient extent to cause the latter to move into contacting engagement with the stationary switch contact 75a. To accomplish this, the prestretched portion of the seal 94 is merely further stretched without in any way impairing the seal.

From FIG. 5 of the drawings, it will be appreciated that the outer parallel rigs 92b and 92d are provided so as to be clampingly engaged by the leg portions 93c of the U-shaped switch spring 93. To accomplish this these leg portions 93c are preferably provided with inwardly directed clamping portions and the parallel ribs 92b and 92d are provided with outwardly directed parallel projections thereby permitting the switch slide 92 to be merely pushed into the recess 33 whereby it will be clampingly held in position by the switch spring 93.

The switch spring 93 is held in the recess 33 by virtue of end projections or the like which firmly engage the ends of the recess 33. If desired, the recess may even be provided with integral lugs for receiving the end projections. From the above description, it will be apparent that with the motor subassembly described above in the position shown in FIG. 4 of the drawings, the motor 38 can readily be energized by actuating the switch slide 92, providing a suitable source of power is connected to the motor terminals through the switch 75a–76a.

In order to complete the hand held power unit 24, there is provided a suitable rechargeable battery 97 which is insertable into the lower end of the housing 30 below the motor 38. Preferably an insulating flanged partition cup 98 is interposed between the motor 38 and the battery 97. This cup is preferably designed to have a cup-shaped portion of such size as to snugly receive the lower portion 40a of the motor housing 40. The circular flange on partition cup 98, designated as 98a, is of such diameter as to just fit within housing 30 thus positioning the lower end of the subassembly including motor 38 concentrically relative to housing 30. To accommodate electrical conductors, such as 82, the flange 98a is preferably provided with a suitable notch or notches not shown. If desired, the interior of the housing 30 may be provided with slight depressions in the walls on each side to accommodate these conductors, as is clearly shown at 99 in FIG. 6 of the drawings.

For the purpose of holding the battery 97 in position and at the same time insulating the same, there is provided an insulating tube 100 which snugly receives both the battery 97 and the portion of the partition cup 98 depending from flange 98a, as clearly shown in FIG. 4 of the drawings, thereby to hold the battery 97 and motor 38 in spaced coaxial relationship. In a device built in accordance with the present invention, the battery 97 was a one and two-tenths volt nickel cadmium rechargeable battery with the exterior of the battery casing comprising the negative terminal designated as 97a and the central portion of one end defining the positive terminal designated as 97b. As shown in FIG. 4, the terminal end of the battery is disposed so as to be remote from the motor 38. The battery 97, partition cup 98, and insulating tube 100 are held in assembled relationship by the molded end cap 34 and an interposed resilient pad 101, which preferably may be made of polyurethane. This assembled relationship of these elements is clearly shown in FIG. 4 of the drawings. The lower end of conductor 82 is connected to positive terminal 97b (FIG. 11) while the negative terminal 97a is connected by a conductor 102 to the negative terminal 68 of motor 38.

For the purpose of providing charging terminals for the power unit 24, there is snugly received within the recess 37 in the end cap 34 a cup-shaped contact 104. Also, a central terminal 105 extends through a central opening in the reentrant portion of the end cap 34. In addition to functioning as a terminal, the element 105 also functions as a fastening means, and by virtue of an annular enlargement 105a clamps the cup contact 104, an insulating washer 106, and a resilient sealing washer 107 into position, as best shown in FIG. 4 of the drawings. It will be appreciated that the sealing washer prevents the entrance of moisture through the opening in end cap 34 provided for the pin 105 and also through another opening provided to accommodate a terminal portion 104a of the cup contact 104.

Figure 11:
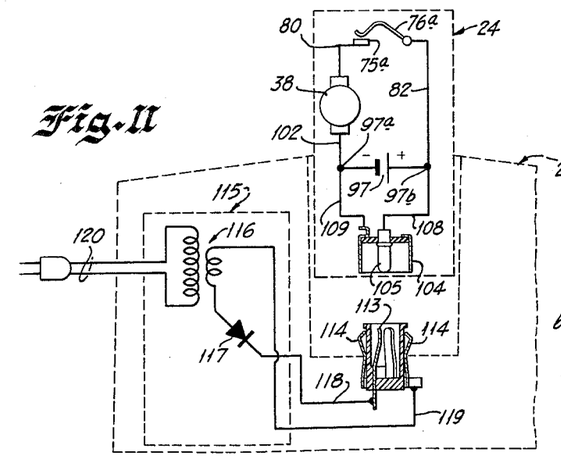
FIG. 11 is a somewhat schematic diagram of the electric circuit of the electric appliance of the present invention.

To complete the charging circuit between the terminals 97a and 97b of the battery 97 and the contacts 104 and 105, as best shown in FIG. 11 of the drawings, a suitable conductor 108 has one end electrically connected to the terminal pin 105 while the other end is electrically connected to the positive terminal 97b of the battery 97. Similarly, a conductor 109 interconnects the terminal 104a of cup contact 104 with the negative battery terminal 97a.

From the above description it will be apparent that the hand held power unit 24 is a compact self-contained unit including an electric motor 38 and the rechargeable battery 97. Selective energization of the motor through actuation of the switch slide 92 causes oscillation of the drive shaft 28. The power unit may be used without interference of a power cord or the like, and when the user is finished, he merely replaces the power unit in a storage position in the charging and support unit 21 where, as will become apparent from the ensuing description, the mere placing of the power unit 24 in the unit 21 causes the charging circuit to be completed for charging the battery 97. It will also be appreciated that the subassembly described above comprising motor 38, drive shaft 28, drive mechanism 48, mechanism support 39 and motor control switch 75a–76a form a part of a larger subassembly including, in addition, battery 97, cup 98, tube 100, end cap 34, and the necessary electrical connections described above all of which may be inserted as a unit into housing 30 through the open end thereof.

Figure 9:
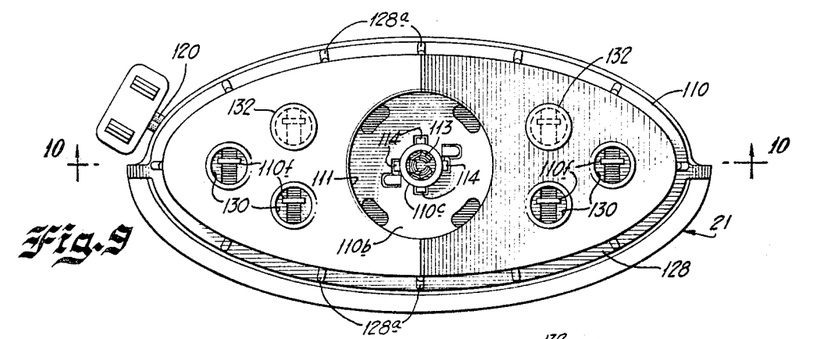
FIG. 9 is a top elevational view of the charging and support unit of FIG. 1 with the cover, power unit, and toothbrush attachments removed.
Figure 10:
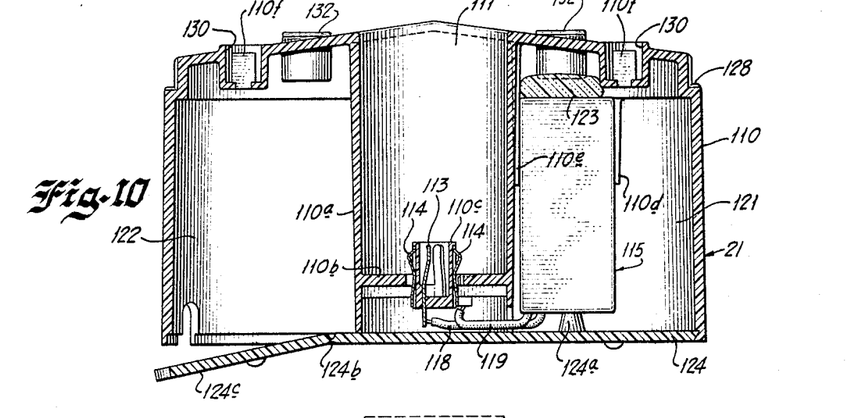
FIG. 10 is a sectional view taken along line 10—10 of FIG. 9 showing the bottom closure in partly open position.

In order that the power unit 24 be connected in a charging circuit by merely disposing the same in the support and charging unit 21, the latter, as best shown in FIGS. 1, 9, and 10 of the drawings, comprises a molded housing member 110 of somewhat oval shape and which is more or less closed at the top and open at the bottom. For the purpose of defining a charging chamber 111, the housing 110 of unit 21 includes an integral centrally disposed cylindrical portion 110a. The charging chamber 111 is in the form of a tapered cylinder wider at the top than at the bottom so as to guide the power unit 24 and position it concentrically with the tubular chamber 111. The chamber 111 is open at the top to readily permit the insertion of power unit 24 and is closed at the bottom by a wall portion 110b supporting an integral cylindrical cup-shaped member 110c also open at the top. A central resilient contact 113, illustrated as a three prong clip, is supported within the cup-shaped member 110c and resilient contact fingers 114 are supported around the exterior of the cup-shaped member 110c whereby contacts 113 and 114 are insulated from each other. So that the contacts 113 and 114 may be supplied with a low direct current charging voltage for the battery 97, there is provided a unit generally designated as 115 which comprises a transformer diode assembly mounted within a suitable container, not shown, filled with a compound so as to provide a completely hermetically sealed unit.

As schematically shown in FIG. 11 of the drawings, the unit 115 (shown by dashed lines) effectively comprises a transformer, generally designated as 116, which is a stepdown transformer having a primary winding adapted to be connected to the conventional 60 cycle, 110 volt circuit by a conventional power cord 120. The output of the secondary winding with the diode associated therewith must be a direct current of around 130 milliamperes at a voltage of the order of one and two-tenths volts. The diode unit is schematically disclosed in FIG. 11 of the drawings as a half wave rectifier 117, although some other arrangement might equally well be employed, the important criteria being that a low voltage direct current output be obtained from the unit 115 which output is connected by conductors 118 and 119 to the terminals 113 and 114, respectively.

The tapered cylinder 110a defining the charging chamber 111 divides the housing 110 into two additional chambers 121 and 122, respectively. For the purpose of supporting the transformer diode assembly within the chamber 121 of housing 110 of the storage and charging unit 22, the chamber 121 is provided with a plurality of finger-like projections, such as 110d and 110e, integrally formed with housing 110 for receiving the unit 115 therebetween. Preferably a suitable resilient pad 123 is provided to cushion the unit 115.

To hold the unit 115 within the chamber 121 in housing 110, the latter is provided with a suitable cover 124 which is suitably secured to the bottom of the housing 110. The cover preferably has a plurality of integral lugs, such as 124a, which engage the end of unit 115 remote from pad 123 and hold it in position compressing the pad 123, as best shown in FIG. 10 of the drawings. The cover 124 closes the bottom of both chambers 121 and 122 of the housing 110. In order that chamber 122 may be a storage chamber for the power cord 120, the cover 124 is provided with a thin walled section 124b effectively defining a hinge so that the cover section 124c closing the open end of chamber 122 defines a readily openable cover for the cord storage chamber.

For the purpose of supporting a plurality of toothbrushes, such as 25, the top of housing 110 is provided with a plurality of cup-shaped recesses 130, each of which recesses have an upwardly projecting tab 110f disposed at the center thereof to be received into the hollow shank of a suitable brush capable of being driven from the drive shaft 28. To support the cover 22, the housing 110 is preferably provided below the top thereof with means defining a shoulder 128. The cover 22 is shaped so as to receive the portion of the housing 110 above the shoulder 128 and to rest on the shoulder 128. As illustrated best in FIGS. 1 and 9 of the drawings, the shoulder 128 includes raised projections 128a integrally formed with housing 110 to support cover 22 in a slightly raised position. Thus, air can enter the bottom of the chamber defined by cover 22 and exit through ventilating openings 26 at the top thereof. If desired, suitable molded closures, such as 132, may be inserted in the recesses 30 not used to support brushes.

It will be apparent that there has been provided a very simple storage and charging unit 21 so that when the cover 22 is removed the user may merely drop the power unit 24 into the chamber 111 whereby the terminal 105 makes contact with the contact 113 and the cup contact 104 makes contact with the fingers 114. The brushes 25, when not in use, are stored in the recesses 130 whereby they are protected from dust by the cover 22. At the same time the moisture contained therein can readily escape through the ventilating openings 26.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. A driving mechanism for a hand held electric appliance of the type having a rotary electric motor and an output drive shaft mounted in a cylindrical casing, said driving mechanism comprising a unitary mechanism support, said support comprising a generally circular base abutting said motor and a generally U-shaped portion spaced from said motor, said circular portion effectively defining one end of said motor, said U-shaped portion being disposed within and generally concentric with said casing and defining a mechanism chamber, gear reduction means disposed in said mechanism chamber, and means for converting rotary motion to oscillatory motion disposed in said chamber, said gear reduction means and said motion converting means being operatively supported in said chamber by said mechanism support.

2. A power unit for an electric toothbrush comprising a generally cylindrical casing having an open end and a closed end, means defining an opening in said closed end, a subassembly adapted to be inserted into said casing through said open end, said subassembly comprising an electric motor, a driving mechansim, an electric switch and support means, a housing for said motor open at one end, said support means comprising a mechanism support for said driving mechanism, said support means including a lower portion closing the open end of said motor housing and an elongated U-shaped upper portion, said U-shaped upper portion being generally concentric with said cylindrical casing, an output drive shaft drivingly connected to said motor through said driving mechanism adapted to extend through said opening upon insertion of said subassembly into said casing, and means for closing the open end of said casing.

3. The electric toothbrush of claim 2 wherein said subassembly comprises an insulating switch plate secured to said support means and spaced from said motor, and said electric switch comprises switch contact means mounted on said switch plate, said switch plate being disposed generally parallel with said closed end.

4. The electric toothbrush of claim 3 wherein said output drive shaft is journaled in bearings mounted in said support means.

5. The electric toothbrush of claim 3 wherein switch actuating means are provided exteriorly of said casing and effective upon manipulation to actuate said switch.

6. The electric toothbrush of claim 5 wherein said switch actuating means includes a reduced thickness flexible wall portion of said casing.

7. In combination with a relatively rigid casing for an appliance powered by an electric motor disposed within said casing, a switch mounted within said casing for controlling said electric motor, said switch being disposed adjacent a wall of said casing, and switch actuating means disposed outside said casing for actuating said switch within said casing, said switch actuating means being mounted on said casing for limited movement relative thereto, said casing comprising a thin deflectable wall portion integral with said casing and movable by said switch actuating means to operate said switch.

8. The combination of claim 7 wherein said casing includes an outwardly opening recess for receiving said switch actuating means and wherein said thin deflectable wall portion defines a part of said recess, said switch actuating means including a member reciprocally movable in said recess.

9. The combination of claim 8 wherein said switch actuating means comprises spring means held in said recess and manually operable slide means having a portion slidably held in said recess by said spring means and an enlarged portion abutting said casing and overlying said recess.

10. The combination of claim 8 wherein said thin deflectable wall portion comprises a tongue formed by a generally U-shaped opening in the bottom of said recess.

11. The combination of claim 10 wherein a stretchable seal is provided in said recess to seal said opening.

12. An electric appliance including in combination a casing and a normally open switch mounted within said casing, said switch including a fixed contact and a movable contact positioned adjacent the inner surface of a portion of said casing and normally spaced from said fixed contact, said casing having a recess formed in the outer surface thereof, the bottom of said recess comprising a flexible resilient tongue integral with said casing and capable of being pressed against said movable contact to close said switch.

13. The electric appliance of claim 12 wherein switch actuating means are mounted in said recess, said switch actuating means comprising a resilient spring member and a manually actuated slide member, said spring member having a portion fixed to said casing and a portion bendable to press against said resilient tongue, the bendable portion including an upwardly extending protuberance said slide member having a recess adapted to receive said protuberance when said slide member is in one position, and having a surface adapted upon movement of said slide member to cam said bendable portion of said spring against said resilient tongue to effect closing of said switch.

14. The driving mechanism of claim 1 wherein said means for converting rotary motion to oscillatory motion comprises a pin associated with said reduction gear means and a yoke engaging said pin, said yoke being connected to said output drive shaft.

References Cited by the Examiner

UNITED STATES PATENTS

| 2,158,738 | 5/1939 | Baker et al. | 15—22 |
|---|---|---|---|
| 2,875,458 | 3/1959 | Tsuda | 15—22 |
| 2,880,737 | 4/1959 | Tone et al. | |
| 3,005,141 | 10/1961 | Emmons | 320—2 |
| 3,072,938 | 1/1963 | Phaneuf | 15—22 |
| 3,104,405 | 9/1963 | Perrinjaquet | 15—22 |
| 3,132,227 | 5/1964 | Butler | 200—157 |
| 3,142,852 | 8/1964 | Phaneuf | 15—22 |
| 3,143,697 | 8/1964 | Springer | 320—2 |
| 3,156,804 | 10/1964 | Springer et al. | 200—157 |
| 3,156,936 | 11/1964 | Hartman et al. | 15—22 |

FOREIGN PATENTS

| 671,982 | 10/1963 | Canada. |
|---|---|---|
| 1,345,588 | 11/1963 | France. |
| 577,198 | 5/1958 | Italy. |

CHARLES A. WILLMUTH, *Primary Examiner.*

EDWARD L. ROBERTS, *Assistant Examiner.*